US012135515B2

(12) United States Patent
Shimura et al.

(10) Patent No.: US 12,135,515 B2
(45) Date of Patent: Nov. 5, 2024

(54) IMAGE FORMING APPARATUS

(71) Applicant: CANON KABUSHIKI KAISHA, Tokyo (JP)

(72) Inventors: Yasuhiro Shimura, Yokohama (JP); Yusuke Saito, Susono (JP); Ryota Ogura, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/358,142

(22) Filed: Jul. 25, 2023

(65) Prior Publication Data

US 2023/0367243 A1 Nov. 16, 2023

Related U.S. Application Data

(63) Continuation of application No. 17/682,217, filed on Feb. 28, 2022, now Pat. No. 11,747,757, which is a (Continued)

(30) Foreign Application Priority Data

May 17, 2017 (JP) ................................ 2017-098262
Apr. 19, 2018 (JP) ................................ 2018-080851

(51) Int. Cl.
*G03G 15/20* (2006.01)
*H05B 1/02* (2006.01)
(Continued)

(52) U.S. Cl.
CPC ......... *G03G 15/2039* (2013.01); *G03G 15/20* (2013.01); *H05B 1/0241* (2013.01);
(Continued)

(58) Field of Classification Search
CPC ... G03G 15/20; G03G 15/2039; H05B 1/0241
(Continued)

(56) References Cited

U.S. PATENT DOCUMENTS 6,222,158 B1 4/2001 Nakata
6,259,073 B1 7/2001 Inukai
(Continued)

FOREIGN PATENT DOCUMENTS

CN 1745340 A 3/2006
CN 104656400 A 5/2015
(Continued)

OTHER PUBLICATIONS

Written Opinion and International Search Report issued in corresponding parent International Application No. PCT/JP2018/017376 dated Jul. 24, 2018.

(Continued)

*Primary Examiner* — Hoan H Tran
(74) *Attorney, Agent, or Firm* — Venable LLP

(57) ABSTRACT

Provided is an image forming apparatus including a temperature sensing circuit to which a temperature sensing element is electrically connected, wherein a surface of a heater on a side where the temperature sensing element is provided is in contact with the inner surface of a film, a heating element is provided in a primary side circuit which is electrically connected to a commercial power supply, and the temperature sensing circuit is electrically insulated from both of the primary side circuit and a secondary side circuit which is electrically insulated from the primary side circuit.

8 Claims, 9 Drawing Sheets

Related U.S. Application Data continuation of application No. 16/928,258, filed on Jul. 14, 2020, now Pat. No. 11,294,310, which is a continuation of application No. 16/680,926, filed on Nov. 12, 2019, now Pat. No. 10,747,151, which is a continuation of application No. PCT/JP2018/017376, filed on May 1, 2018.

(51) Int. Cl.
*H05B 3/00* (2006.01)
*H05B 3/03* (2006.01)
*H05B 3/10* (2006.01)

(52) U.S. Cl.
CPC ................. *H05B 3/00* (2013.01); *H05B 3/03* (2013.01); *H05B 3/10* (2013.01)

(58) Field of Classification Search
USPC ...................................................... 399/67, 69
See application file for complete search history.

(56) References Cited

U.S. PATENT DOCUMENTS

| | | | | |
|---|---|---|---|---|
| 6,870,140 | B2 | 3/2005 | Cook | |
| 7,702,249 | B2 | 4/2010 | Nishida | |
| 8,744,289 | B2 | 6/2014 | Shimura | |
| 9,037,008 | B2 | 5/2015 | Hase et al. | |
| 9,235,166 | B2 * | 1/2016 | Shimura | G03G 15/2053 |
| 9,250,580 | B2 | 2/2016 | Sugaya | |
| 9,261,826 | B2 | 2/2016 | Kataoka et al. | |
| 9,261,828 | B1 * | 2/2016 | Nishi | G03G 15/2039 |
| 9,291,960 | B2 | 3/2016 | Yoshimura | |
| 9,501,006 | B2 * | 11/2016 | Shimokawa | G03G 15/2039 |
| 10,747,151 | B2 | 8/2020 | Shimura et al. | |
| 2006/0157464 | A1 | 7/2006 | Omata et al. | |
| 2009/0139982 | A1 | 6/2009 | Cao et al. | |
| 2009/0257770 | A1 | 10/2009 | Miyazaki | |
| 2010/0150595 | A1 | 6/2010 | Harris | |
| 2015/0177656 | A1 | 6/2015 | Yoshimura | |

FOREIGN PATENT DOCUMENTS

| | | | |
|---|---|---|---|
| CN | 104797986 | A | 7/2015 |
| CN | 106133616 | A | 11/2016 |
| CN | 106558991 | A | 4/2017 |
| EP | 1510885 | A2 | 3/2005 |
| JP | 10154571 | A | 6/1998 |
| JP | 11194837 | A | 7/1999 |
| JP | 2000-020141 | A | 1/2000 |
| JP | 2002-258640 | A | 9/2002 |
| JP | 2003-280447 | A | 10/2003 |
| JP | 2007-052176 | A | 3/2007 |
| JP | 2007-212503 | A | 8/2007 |
| JP | 2015-121687 | A | 7/2015 |
| JP | 2017-054071 | A | 3/2017 |
| WO | 2017-043020 | A1 | 3/2017 |

OTHER PUBLICATIONS

International Preliminary Report on Patentability issued Nov. 19, 2019, in corresponding PCT application No. PCT/JP2018/017376.
Chinese Office Action issued on Jul. 26, 2021 in counterpart Chinese Patent Appln. No. 201880032450.5.
Notification to Grant issued by the Chinese patent office on Sep. 30, 2022 in counterpart Chinese Patent Appln. No. 201880032450.5.
Extended European Search Report issued on Jan. 13, 2023 in counterpart European Patent Appln. No. 22183503.6.

* cited by examiner

IMAGE FORMING APPARATUS

CROSS-REFERENCE TO RELATED APPLICATIONS

This application is a Continuation of U.S. patent application Ser. No. 17/682,217, filed Feb. 28, 2022, which is a Continuation of U.S. patent application Ser. No. 16/928,258, filed Jul. 14, 2020, now issued as U.S. Pat. No. 11,294,310 on Apr. 5, 2022, which is a Continuation of U.S. patent application Ser. No. 16/680,926, filed on Nov. 12, 2019, now issued as U.S. Pat. No. 10,747,151 on Aug. 18, 2020, which is a Continuation of International Patent Application No. PCT/JP2018/017376, filed May 1, 2018, which claims the benefit of Japanese Patent Applications No. 2017-098262, filed May 17, 2017, and No. 2018-080851, filed Apr. 19, 2018 which are hereby incorporated by reference herein in their entirety.

BACKGROUND OF THE INVENTION

Field of the Invention

The present invention relates to an image forming apparatus such as a copier or a printer which uses the electrophotographic system or the electrostatic recording system.

Background Art

Conventionally, as a fixing apparatus provided in an image forming apparatus, there is an apparatus which has an endless belt (also referred to as an endless film), a flat heater which is in contact with the inner surface of the endless belt, and a roller which forms a nip portion with the heater via the endless belt. Japanese Patent Application Publication No. H11-194837 proposes a method for sensing the temperature of the nip portion with high accuracy by forming a thermistor on the surface of a heater substrate on the side of the endless belt.

SUMMARY OF THE INVENTION

However, in the case where the thermistor is formed on the surface of the heater on the side of the nip portion, in order to secure an adequate withstand voltage of the fixing apparatus, it is necessary to form the thermistor such that the thermistor has a thick surface protective layer, or increase the width of the substrate of the heater.

When the thickness of the surface protective layer of the thermistor is increased, a problem arises in that the heat transfer efficiency of the heater and accuracy in sensing the nip temperature are reduced. When the width of the substrate of the heater is increased, a problem arises in that the size of the apparatus is increased.

An object of the present invention is to provide a technique which allows a temperature sensing element to be disposed on a sliding surface of a heater which slides on a film while preventing a reduction in each of the thermal responsiveness and the heat transfer efficiency of the heater and preventing an increase in the size of the heater.

In order to achieve the above object, an image forming apparatus of the present invention is an image forming apparatus comprising:

an image forming portion for forming an image on a recording material; and a fixing portion including a tubular film and a heater including a substrate, a heating element provided on the substrate, and a temperature sensing element provided on a surface of the substrate opposite to a surface on which the heating element is provided, wherein the fixing portion fixes the image formed on the recording material to the recording material with heat from the heater which is controlled according to a sensed temperature by the temperature sensing element, wherein the image forming apparatus includes a temperature sensing circuit to which the temperature sensing element is electrically connected, a surface of the heater on a side where the temperature sensing element is provided is in contact with an inner surface of the film, the heating element is provided in a primary side circuit which is electrically connected to a commercial power supply, and the temperature sensing circuit is electrically insulated from both of the primary side circuit and a secondary side circuit which is electrically insulated from the primary side circuit.

According to the present invention, it is possible to dispose the temperature sensing element on the sliding surface of the heater which slides on the film while preventing the reduction in each of the thermal responsiveness and the heat transfer efficiency of the heater and preventing the increase in the size of the heater.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

Embodiment 1

Figure 1:
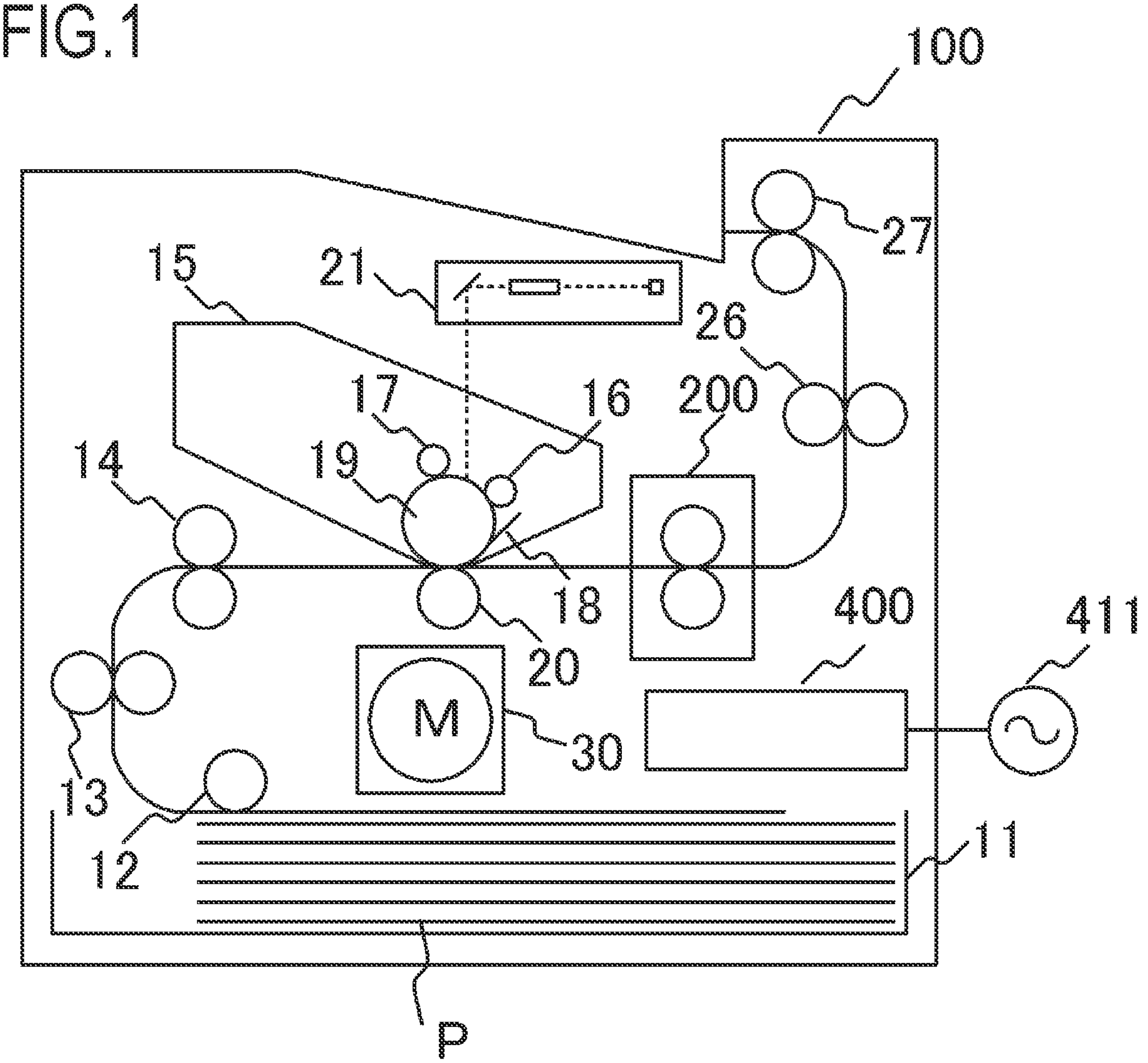
FIG. 1 is a cross-sectional view of an image forming apparatus of each of Embodiments 1 and 2.

FIG. 1 is a schematic cross-sectional view of an image forming apparatus of an embodiment of the present invention. An image forming apparatus 100 of the present embodiment is a laser printer which forms an image on a recording material by using the electrophotographic system.

When a print signal is generated, a scanner unit 21 emits laser light modulated according to image information, and scans the surface of a photosensitive drum (electrophotographic photosensitive member) 19 which is charged to a predetermined polarity by a charging roller 16. With this, an electrostatic latent image is formed on the photosensitive drum 19 serving as an image bearing member. Toner charged to a predetermined polarity is supplied to the electrostatic latent image from a developing roller 17, and the electrostatic latent image on the photosensitive drum 19 is thereby developed as a toner image (developer image). On the other hand, a recording material (recording sheet) P stacked on a sheet feeding cassette 11 is fed one by one by a pickup roller 12, and is transported toward a resist roller pair 14 by a transport roller pair 13. Further, the recording material P is transported to a transfer position from the resist roller pair 14 in synchronization with timing at which the toner image on the photosensitive drum 19 reaches the transfer position formed by the photosensitive drum 19 and a transfer roller 20 serving as a transfer member. The toner image on the photosensitive drum 19 is transferred to the recording material P when the recording material P passes through the transfer position. Thereafter, the recording material P is heated in a fixing apparatus 200 serving as a fixing portion, and the toner image is heated and fixed to the recording material P. The recording material P which bears the fixed toner image is discharged to a sheet discharge tray in the upper portion of the image forming apparatus 100 by transport roller pairs 26 and 27. Note that the photosensitive member 19 is cleaned by a cleaner 18. A motor 30 drives the fixing apparatus 200 and the like. The reference numeral 400 denotes a control circuit connected to a commercial AC power supply (commercial power supply) 411, and power is supplied to the fixing apparatus 200 by the control circuit 400.

The photosensitive drum 19, the charging roller 16, the scanner unit 21, the developing roller 17, and the transfer roller 20 which are described above constitute an image forming portion which forms an unfixed image on the recording material P. In addition, in the present embodiment, a developing unit including the photosensitive drum 19, the charging roller 16, and the developing roller 17 and a cleaning unit including the cleaner 18 are configured to be attachable to and detachable from the apparatus main body of the image forming apparatus 100 as a process cartridge 15.

The image forming apparatus 100 of the present embodiment supports a plurality of recording material sizes. In the sheet feeding cassette 11, it is possible to set, e.g., Letter paper (about 216 mm×279 mm), Legal paper (about 216 mm×356 mm), A4 paper (210 mm×297 mm), and Executive paper (about 184 mm×267 mm). Further, it is also possible to set JIS B5 paper (182 mm×257 mm), and A5 paper (148 mm×210 mm). The image forming apparatus of the present embodiment is basically a laser printer which longitudinally sends a sheet (transports a sheet such that the long side of the sheet is horizontal to a transport direction). Note that, similarly to the present embodiment, the present invention can also be applied to a printer which laterally sends a sheet. The recording materials having, among the widths of a standard-sized recording material supported by the apparatus (the widths of the recording material in a catalogue), the largest width are Letter paper and Legal paper, and the width of each paper is about 216 mm. The recording material P with a paper width smaller than the maximum size supported by the apparatus is defined as small-sized paper in the present embodiment.

Figure 2:
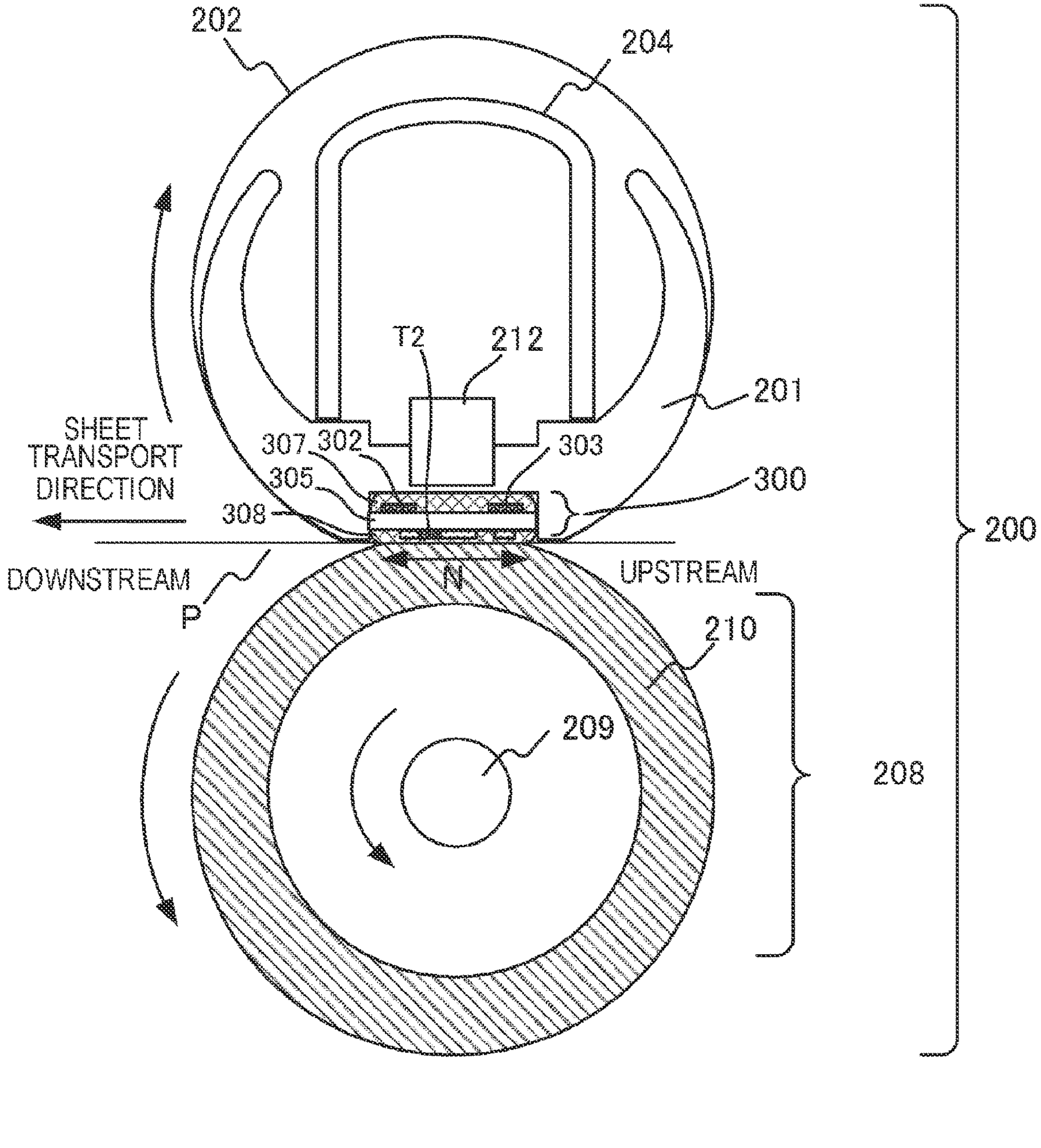
FIG. 2 is a cross-sectional view of a fixing apparatus of Embodiment 1.

FIG. 2 is a cross-sectional view of the fixing apparatus 200 of the present embodiment. The fixing apparatus 200 has a fixing film (hereinafter referred to as a film) 202, a heater 300 which is in contact with the inner surface of the film 202, a pressure roller 208 which forms a fixing nip portion N with the heater 300 via the film 202, and a metal stay 204.

The film 202 is a heat-resistant film formed into a tubular shape which is also referred to as an endless belt or an endless film, and the material of its base layer is a heat-resistant resin such as a polyimide, or metal such as stainless steel. An elastic layer made of heat-resistant rubber or the like may be provided on the surface of the film 202. The pressure roller 208 has a core metal 209 made of a material such as iron or aluminum, and an elastic layer 210 made of a material such as silicone rubber. The heater 300 is held by a holding member 201 made of a heat-resistant resin. The holding member 201 also has a guide function of guiding the rotation of the film 202. The stay 204 applies pressure of a spring which is not shown to the holding member 201. The pressure roller 208 receives power from the motor 30 and rotates in an arrow direction. The film 202 is caused to rotate by the rotation of the pressure roller 208. The recording material P bearing an unfixed toner image is heated and subjected to a fixing process while being held and transported by the fixing nip portion N.

The heater 300 has resistance heating elements (hereinafter referred to as heating elements) 302 and 303 provided on a surface of a ceramic substrate 305 on a side where the heater 300 is in contact with the holding member 201 (hereinafter, this surface is defined as a back surface). On a surface on the side of the fixing nip portion N where the heater 300 is in contact with the film 202 (hereinafter, this surface is defined as a sliding surface), a thermistor T2 (T1 to T3) serving as a temperature sensing element is provided. A surface protective layer 308 is a layer for protecting the thermistor T2 (T1 to T3) and securing slidability of the fixing nip portion N, and the material of the surface protective layer 308 is insulating glass. The surface protective layer 308 is formed so as to cover the thermistor T2 (T1 to T3) on an opposing surface which opposes the fixing nip portion N in the ceramic substrate 305. A surface protective layer 307 serving as an insulating layer provided on a side opposite to the fixing nip portion N is used for insulating the heating elements, and the material of the surface protective layer 307 is insulating glass.

In addition, a safety element 212 such as a thermo switch or a thermal fuse, which operates in response to abnormal heat generation of the heater 300 to interrupt power supplied to the heater 300, abuts directly or indirectly on the heater 300 via the holding member 201.

Figure 3A:
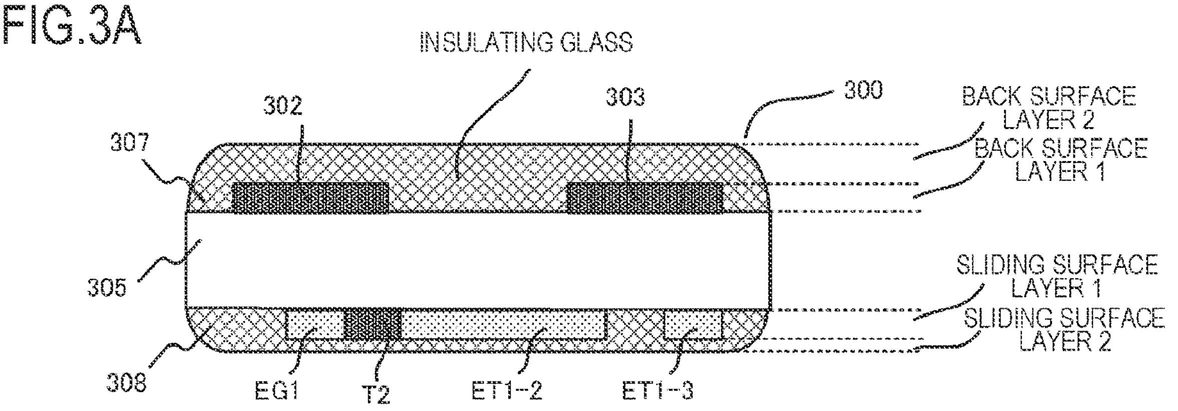
FIGS. 3A and 3B are configuration diagrams of a heater of the fixing apparatus of Embodiment 1.
Figure 3B:
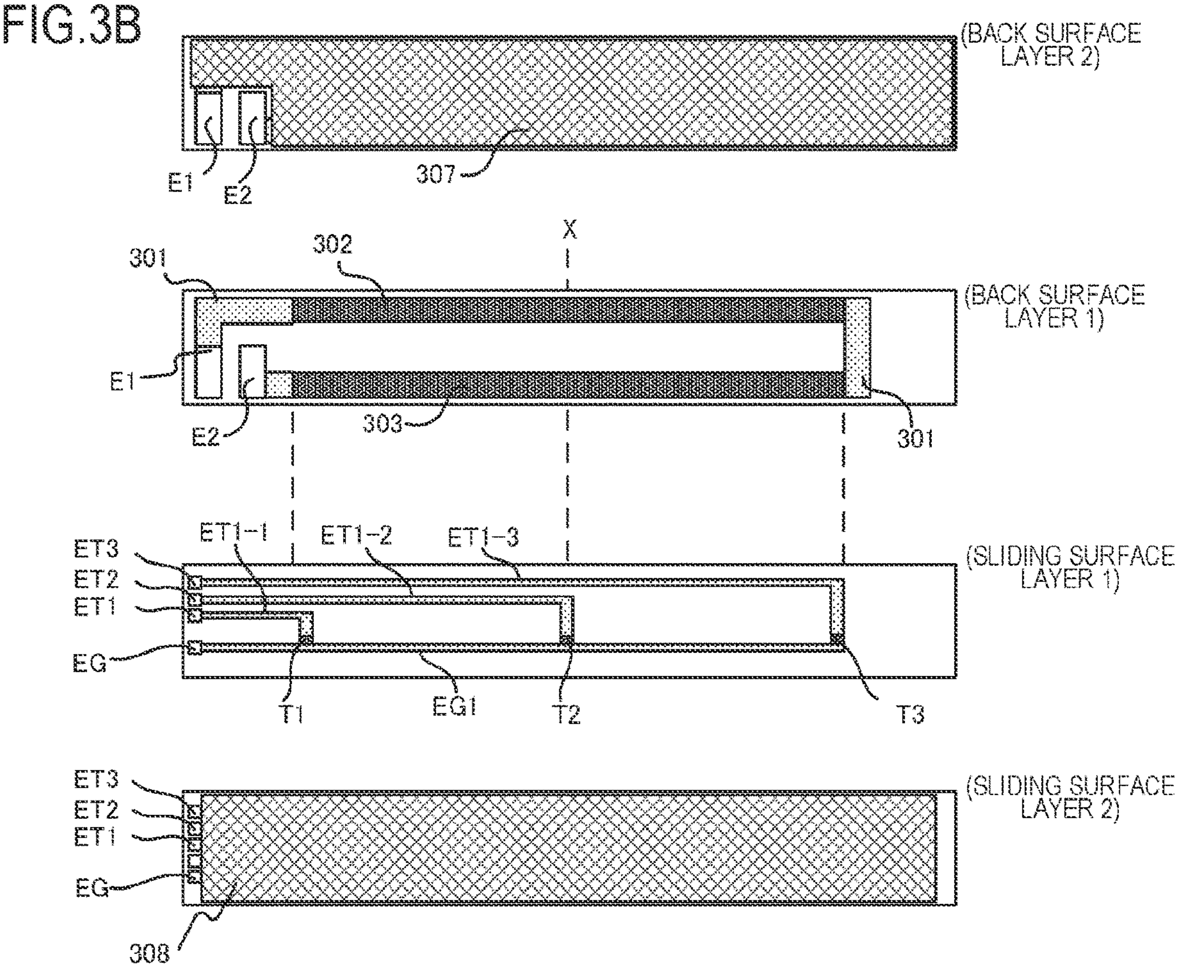

The configuration of the heater 300 according to the present embodiment will be described by using FIG. 3. FIG. 3(A) is a cross-sectional view of the heater 300, and FIG. 3(B) is a plan view of each layer of the heater 300. FIG. 3(B) shows a transport reference position X of the recording material P in the image forming apparatus 100 of the present embodiment. The transport reference in the present embodiment is a center reference, and the recording material P is transported such that the center line in a direction orthogonal to the transport direction of the recording material P (i.e., a width direction) moves along the transport reference position X. The sheet feeding cassette 11 has a position control plate which controls the position of the recording material P in the width direction. The recording material P stacked on the sheet feeding cassette 11 is fed and then transported such that the central portion of the recording material P passes through the transport reference position X. FIG. 3(A) is a cross-sectional view of the heater 300 at the transport reference position X.

The heater 300 has the heating elements 302 and 303 on a back surface layer 1. In addition, on a back surface layer 2 of the heater 300, the insulating surface protective layer 307 (made of glass in the present embodiment) which covers the heating elements 302 and 303 is provided. On a sliding surface layer 1 of the heater 300, the thermistor T2 (T1 to T3) and electrical conductors (EG1, ET1-1 to ET1-3) for connection with the thermistors are provided. Further, on a sliding surface layer 2 of the heater 300, the insulating surface protective layer 308 (made of glass in the present embodiment) which covers the thermistor T2 (T1 to T3) and the electrical conductors (EG1, ET1-1 to ET1-3) is provided. The surface protective layer (second insulating layer) 308 of the present embodiment is thinner than the surface protective layer (first insulating layer) 307 that requires basic insulation. Although details will be described later, the surface protective layer (second insulating layer) 308 of the present embodiment does not need to be subjected to the basic insulation. It is only required that the surface protective layer 308 is subjected to functional insulation such that the thermistors T1 to T3 are not damaged. Consequently, the surface protective layer 308 can be made thinner than the surface protective layer 307, and thermal conductivity from the heater 300 to the film 202 can be increased by making the surface protective layer 308 thinner than the surface protective layer 307.

As shown in FIG. 3(B), on the back surface layer 1 of the heater 300, the heating element 302 and the heating element 303 are connected in series via an electrical conductor 301, and power can be supplied from electrodes E1 and E2. On the back surface layer 2 of the heater 300, the surface protective layer 307 is provided so as to cover the back surface layer 1 except the portions of the electrodes E1 and E2. By covering the electrical conductor 301 and the heating elements 302 and 303 with the surface protective layer 307 and the substrate 305, the basic insulation is provided between the electrical conductor 301 and the heating elements 302 and 303 on the primary side of the commercial power supply 411, and the film 202 and the thermistor T2. Herein, the basic insulation denotes insulation which is provided for performing basic protection against an electric shock. In addition, double insulation which will appear in the following description denotes insulation in which additional insulation for protection in the case where the basic insulation fails is further performed in addition to the basic insulation. Reinforced insulation is single insulation which provides protection against an electric shock at a level similar to the level of protection by the double insulation. Note that, in the present embodiment, the reinforced insulation and the double insulation are collectively referred to as reinforced insulation.

On the sliding surface layer 1 of the heater 300, the thermistors T1, T2, and T3 formed of a material having a positive TCR (temperature coefficient of resistance) (PTC: positive temperature coefficient) or a negative TCR (NTC: negative temperature coefficient) are installed for sensing the temperature of the heater 300. The property of each of the thermistors T1, T2, and T3 of the present embodiment displays the NTC. The thermistor T2 disposed at a central portion is a thermistor for temperature control of the heater 300, and each of the thermistors T1 and T3 is a thermistor which is used sensing an increase in the temperature of a non-sheet passing portion caused when the small-sized paper is fed. The thermistor T1 is connected to an electrical conductor ET1, the thermistor T2 is connected to an electrical conductor ET2, and the thermistor T3 is connected to an electrical conductor ET3. An electrical conductor EG is a common electrical conductor which is shared by the thermistors T1, T2, and T3. On the sliding surface layer 2 of the heater 300, the surface protective layer 308 is provided so as to cover the sliding surface layer 1 except the electrode portions of the electrical conductors ET1 to ET3 and EG.

Figure 4:
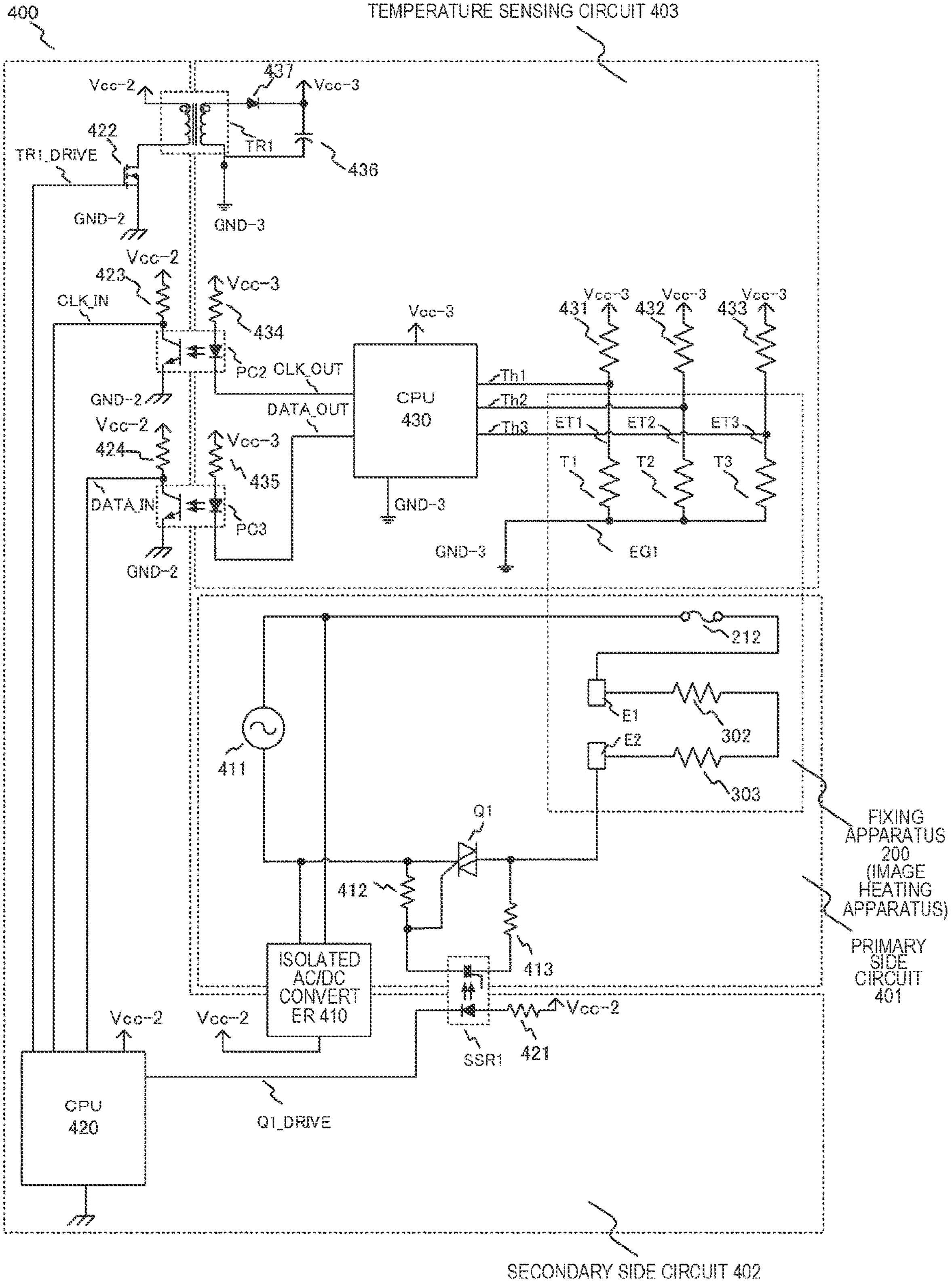
FIG. 4 is a view of a power supply circuit of the fixing apparatus of Embodiment 1.

FIG. 4 shows a circuit diagram of a power supply circuit 400 of the heater 300 of Embodiment 1. The power supply circuit 400 is constituted by three electrically insulated circuit blocks: a primary side circuit 401, a secondary side circuit 402, and a temperature sensing circuit 403.

The primary side circuit 401 is a circuit which supplies power supplied from the commercial power supply 411 connected to the image forming apparatus 100 to the heating elements 302 and 303 of the heater 300. The heating elements 302 and 303 are provided in the primary side circuit 401 which is electrically connected to the commercial power supply 411. Power control of the heater 300 is performed by using energization/interruption of a triac Q1. The triac Q1 is controlled with a Q1_DRIVE signal outputted from a CPU 420 serving as the control portion (secondary control portion) of the secondary side circuit 402. The control portion 420 is provided in the secondary side circuit 402 which is electrically insulated from the primary side circuit 401. The reinforced insulation (hereinafter, the reinforced insulation includes the double insulation though the description thereof will be omitted) is provided between the primary side circuit and the secondary side circuit (secondary control portion) by a phototriac coupler SSR1. When the Q1_DRIVE signal is brought into a LoW state, a current flows to a secondary photodiode of SSR1, and a primary triac of SSR1 operates. Subsequently, when the current flows to resistors 412 and 413, the triac Q1 is brought into an ON state. An isolated AC/DC converter 410 is a switched-mode power supply circuit which supplies power to the secondary side circuit 402 from the primary side circuit 401, and secures the reinforced insulation between the primary side circuit 401 and the secondary side circuit 402 with a transformer which is not shown.

Figure 9:
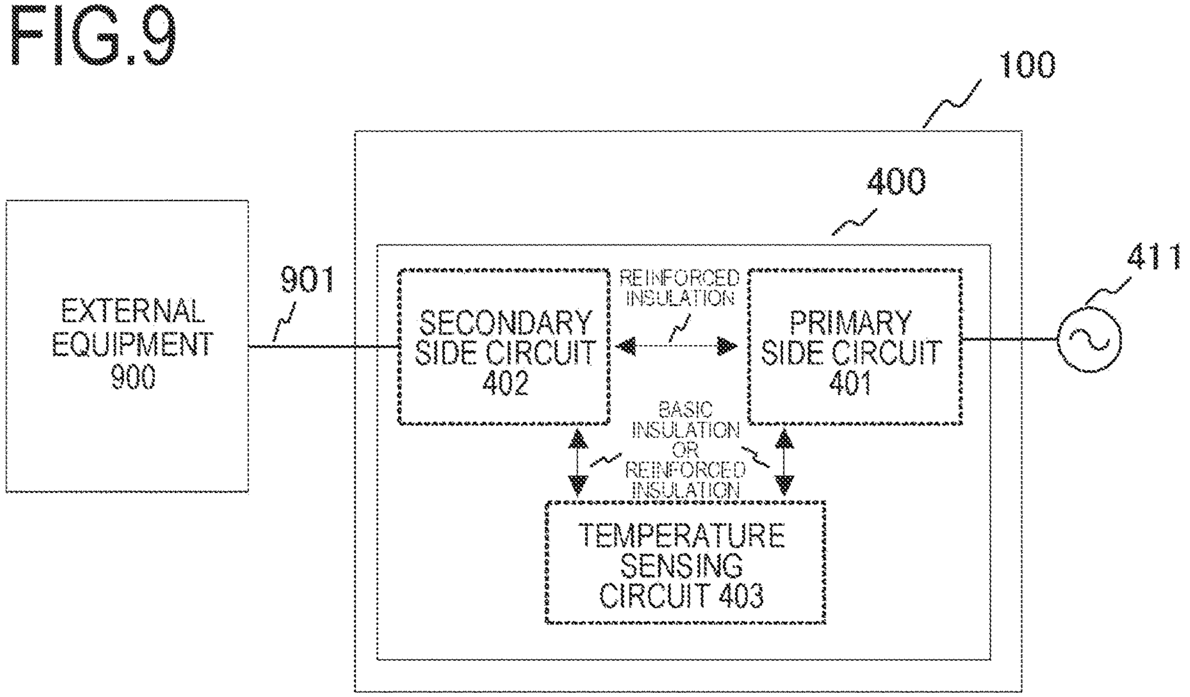
FIG. 9 is a view showing a relationship between each circuit and external equipment.

Incidentally, when a process for removing a jammed sheet is performed, a user opens the door of the image forming apparatus 100. The image forming apparatus 100 has electric components and wiring which can be touched by the user in a state in which the door is opened. As shown in FIG. 9, an interface cable 901 (USB, LAN) used for connection to external equipment 900 such as a PC is also one of the electric components which can be touched by the user. In the present embodiment, as shown in FIG. 9, the electric component at a position which allows the user to touch the electric component is connected to the secondary side circuit 402, and the reinforced insulation is provided between the primary side circuit 401 to which the commercial power supply 411 is connected and the secondary side circuit 402. With this configuration, even when the user touches the electric component or the wire at the position which allows the user to touch the electric component or the wiring, an electric shock can be prevented.

Next, the temperature sensing circuit 403 will be described. The resistance values of the thermistors T1 to T3 change according to the temperature of the heater 300. The resistance values of the thermistors T1 to T3 and the divided voltages of resistors 431 to 433 are inputted to a CPU 430 as Th1 to Th3 signals. The CPU 430 senses the heater temperature based on the Th1 to Th3 signals. Temperature information sensed by the CPU 430 of the temperature sensing circuit 403 is outputted as a CLK_OUT signal and a DATA_OUT signal, and the signals are transmitted to the CPU 420 of the secondary side circuit 402 by data transmission. The reinforced insulation is provided between CLK_OUT and CLK_IN, and between DATA_OUT and DATA_IN by photocouplers PC2 and PC3.

Incidentally, the basic insulation or the reinforced insulation is provided between the temperature sensing circuit 403 and the primary side circuit 401. In addition, the temperature sensing circuit 403 is a circuit which cannot be touched by the user. Further, the basic insulation or the reinforced insulation is provided between the temperature sensing circuit 403 and the secondary side circuit 402. Thus, the secondary side circuit 402 is different from the temperature sensing circuit 403 in that, while the secondary side circuit 402 has the electric component or the wiring which can be touched by the user, the temperature sensing circuit 403 does not have the electric component or the wiring which can be touched by the user. An effect obtained by insulating the temperature sensing circuit 403 from both of the primary side circuit 401 and the secondary side circuit 402 will be described later.

A transformer TR1 is an insulated transformer which is used for performing power supply to the temperature sensing circuit 403 from the secondary side circuit 402, and is subjected to the reinforced insulation. A power supply voltage is supplied to the side of the temperature sensing circuit 403 of the transformer TR1 by switching an FET 422 with a TR1_DRIVE signal of the CPU 420. A diode 437 and a capacitor 436 serve as a rectifying-smoothing circuit of the output of the transformer TR1.

Thus, the temperature information of the heater 300 sensed by the temperature sensing circuit 403 is transmitted to the secondary side circuit 402 by information transmission. Subsequently, the secondary side circuit 402 performs control of power supplied to the heater 300 from the primary side circuit 401 based on the temperature information of the heater 300. In internal processing of the CPU 420, power to be supplied is calculated by using, e.g., PI control based on the set temperature of the heater 300 and the sensed temperature by the thermistor. Further, a phase angle (phase control) or a wave number (wave number control) corresponding to the calculated power to be supplied is determined, and the triac Q1 is controlled at timing of the determined phase angle or wave number.

Herein, a description will be given of an advantage obtained by insulating the thermistors T1 to T3 and the temperature sensing circuit 403 of the heater 300 from both of the primary side circuit 401 and the secondary side circuit 402.

First, the thermistors T1 to T3 are insulated from the primary side circuit 401, and hence the potentials of the thermistors T1 to T3 are safe potentials, and it is not necessary to insulate the thermistors T1 to T3 from the film 202. Accordingly, as described above, it is possible to reduce the thickness of the surface protective layer 308.

In addition, the thermistors T1 to T3 are insulated from the secondary side circuit 402, and hence it is not necessary to provide the reinforced insulation between the thermistors T1 to T3 and the heating elements 302 and 303. The basic insulation between the heating elements 302 and 303 and the thermistors T1 to T3 is achieved by the substrate 305 and the surface protective layer 307. Consequently, it is possible to dispose the thermistors T1 to T3 and the electrical conductors ET1 to ET3 and EG to which the thermistors are connected at any positions on the sliding surface layer (the end potion of the substrate 305 in a lateral direction and the like).

A description will be given of a disadvantage in the case where the thermistors T1 to T3 and the temperature sensing circuit 403 are not insulated from the primary side circuit 401. In order to insulate the film 202 from the primary side circuit, it is necessary to increase the thickness of the surface protective layer 308 of the thermistors T1 to T3. In general, the thermal conductivity of glass used in the surface protective layer 308 is several tens of times to several hundred times lower than that of ceramic used in the substrate 305, and hence, when the thickness of the surface protective layer 308 is increased, heat resistances between the heating elements 302 and 303 and the nip portion N are increased. Therefore, when the thickness of the surface protective layer 308 is increased, the heat transfer efficiency from the heater 300 to the nip portion N is reduced, and accuracy in sensing the temperature of the nip portion N by the thermistors T1 to T3 is also reduced.

A description will be given of a disadvantage in the case where the thermistors T1 to T3 and the temperature sensing circuit 403 are not insulated from the secondary side circuit 402. It is necessary to provide the reinforced insulation between the primary side circuit 401 and the secondary side circuit 402, and hence it is necessary to secure a sufficient creepage distance between the heating elements 302 and 303 of the heater 300 and the thermistors T1 to T3 in addition to the insulation by the surface protective layer 307. Accordingly, it is necessary to dispose the thermistors T1 to T3 and the electrical conductors ET1 to ET3 and EG such that the thermistors T1 to T3 and the electrical conductors ET1 to ET3 and EG are spaced a predetermined creepage distance from the end portion of the substrate 305 in the lateral direction. When the width of the substrate 305 in the lateral direction is increased for securing the sufficient creepage distance, the size of the heater is increased. As a result, the material cost of the substrate 305 is increased and the heat capacity of the heater 300 is also increased, and hence a problem arises in that the start-up time of the heater 300 is increased.

As described thus far, the heater 300 and the power supply circuit 400 of the present embodiment have the following features. • Insulation is provided between the heating elements 302 and 303 serving as the primary side circuit, and the film 202 and the thermistors T1 to T3 by covering the heating elements 302 and 303 with the surface protective layer 307 and the substrate 305 of the heater 300. • The temperature sensing circuit 403 is insulated from both of the primary side circuit 401 and the secondary side circuit 402. • The thermistors T1 to T3 are insulated from both of the primary side circuit 401 and the secondary side circuit 402, and hence it is possible to reduce the thickness of the surface protective layer 308. • It is possible to dispose the thermistors T1 to T3 and the electrical conductors ET1 to ET3 and EG to which the thermistors are connected at any positions on the sliding surface layer of the substrate 305. Therefore, it is possible to reduce the width of the substrate of the heater 300 in the lateral direction (a direction orthogonal to a longitudinal direction), and increase the thermal responsiveness of the heater 300. Thus, the image forming apparatus of Embodiment 1 can dispose the temperature sensing element on the sliding surface of the heater which slides on the film while preventing a reduction in each of the thermal responsiveness and the heat transfer efficiency of the heater and preventing an increase in the size of the heater.

Embodiment 2

Embodiment 2 of the present invention will be described. Components in Embodiment 2 which are the same as those in Embodiment 1 are designated by the same reference numerals, and the description thereof will be omitted. Matters which are not described specifically in Embodiment 2 are the same as those in Embodiment 1. A heater 600 of Embodiment 2 has heating blocks HB1 to HB7 which can be controlled individually. An increase in the temperature of the non-sheet passing portion in the case where the small-sized paper is fed can be prevented by individually controlling the temperatures of the heating blocks HB1 to HB7 based on the recording material size and image information, and power consumption of a fixing apparatus 500 can be reduced by reducing heat generation at a place where heating is not necessary.

Figure 5:
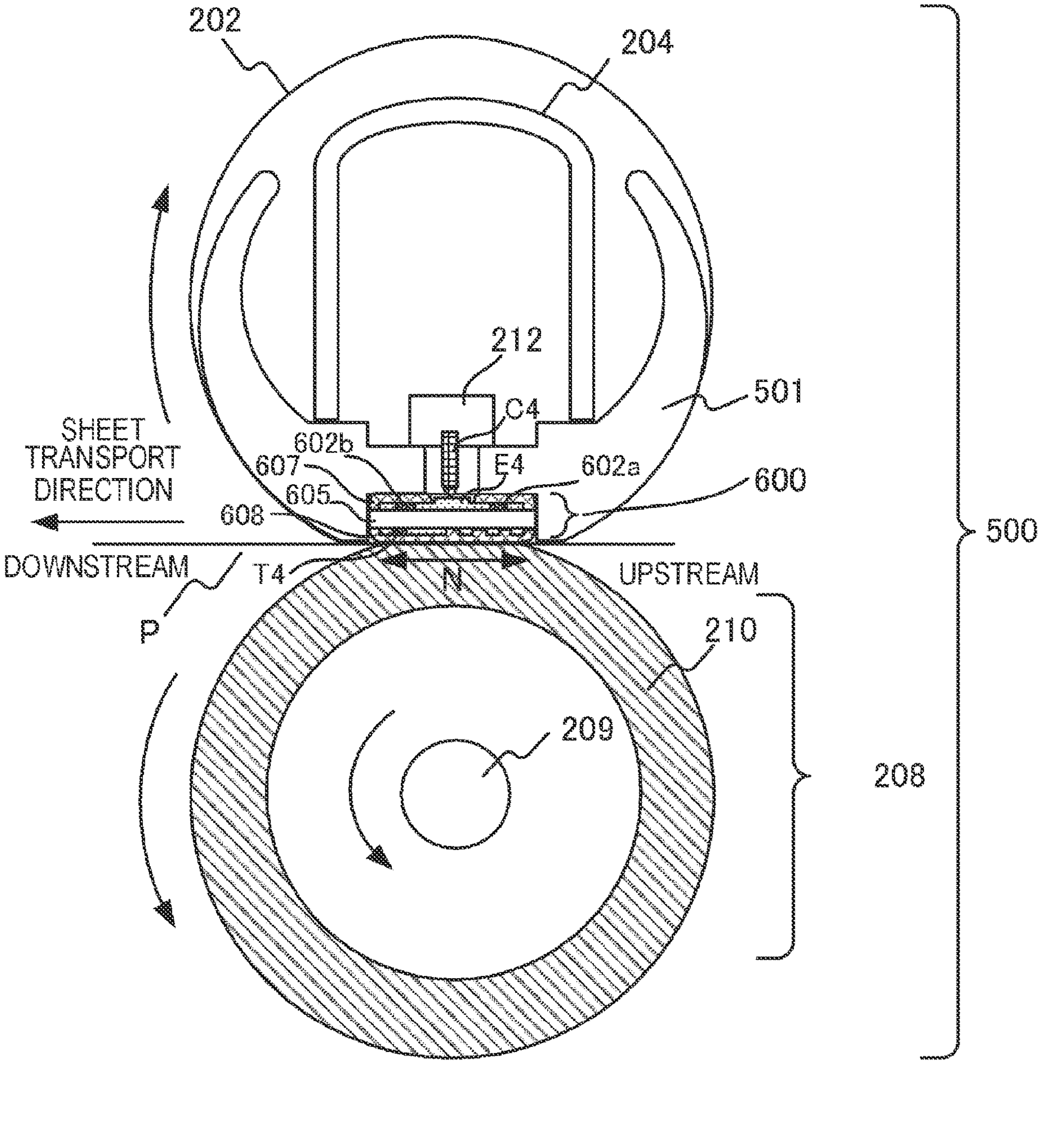
FIG. 5 is a cross-sectional view of a fixing apparatus of Embodiment 2.

FIG. 5 is a cross-sectional view of the fixing apparatus 500. The fixing apparatus 500 has an electrode (herein, an electrode E4 is shown as a representative) on a surface of the heater 600 opposite to a surface thereof opposing the fixing nip portion N. In addition, in the fixing apparatus 500, a plurality of electrical contacts (herein, an electrical contact C4 is shown as a representative) connected to the electrodes of the heater 600 are provided, and power is supplied from each electrical contact to each electrode. The detailed description of the heater 600 will be made in FIG. 6.

The heater 600 has a heating element 602 provided on the side of a back surface of a substrate 605 opposite to the side of a surface thereof (the side of a sliding surface) opposing the fixing nip portion N (a sliding portion which slides on the film 202). A surface protective layer 607 is glass used for insulating the heating element 602. A thermistor T4 (T1 to T7) is provided on the side of the sliding surface of the substrate 605. A surface protective layer 608 is glass used for protecting the thermistor T4 (T1 to T7) and obtaining slidability of the fixing nip portion N. In addition, in a holding member 501 which holds the heater 600, holes for connecting the electrodes and the electrical contacts are provided. The detailed description thereof will be made in FIG. 6.

Figure 6A:
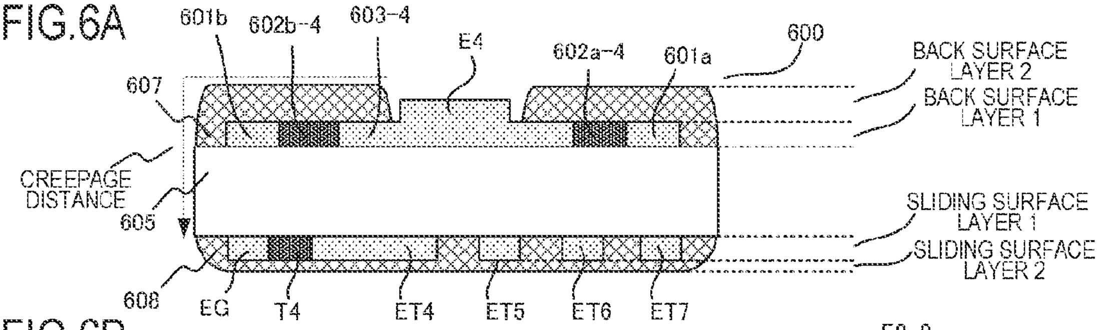
FIGS. 6A to 6C are configuration diagrams of a heater of the fixing apparatus of Embodiment 2.
Figure 6B:
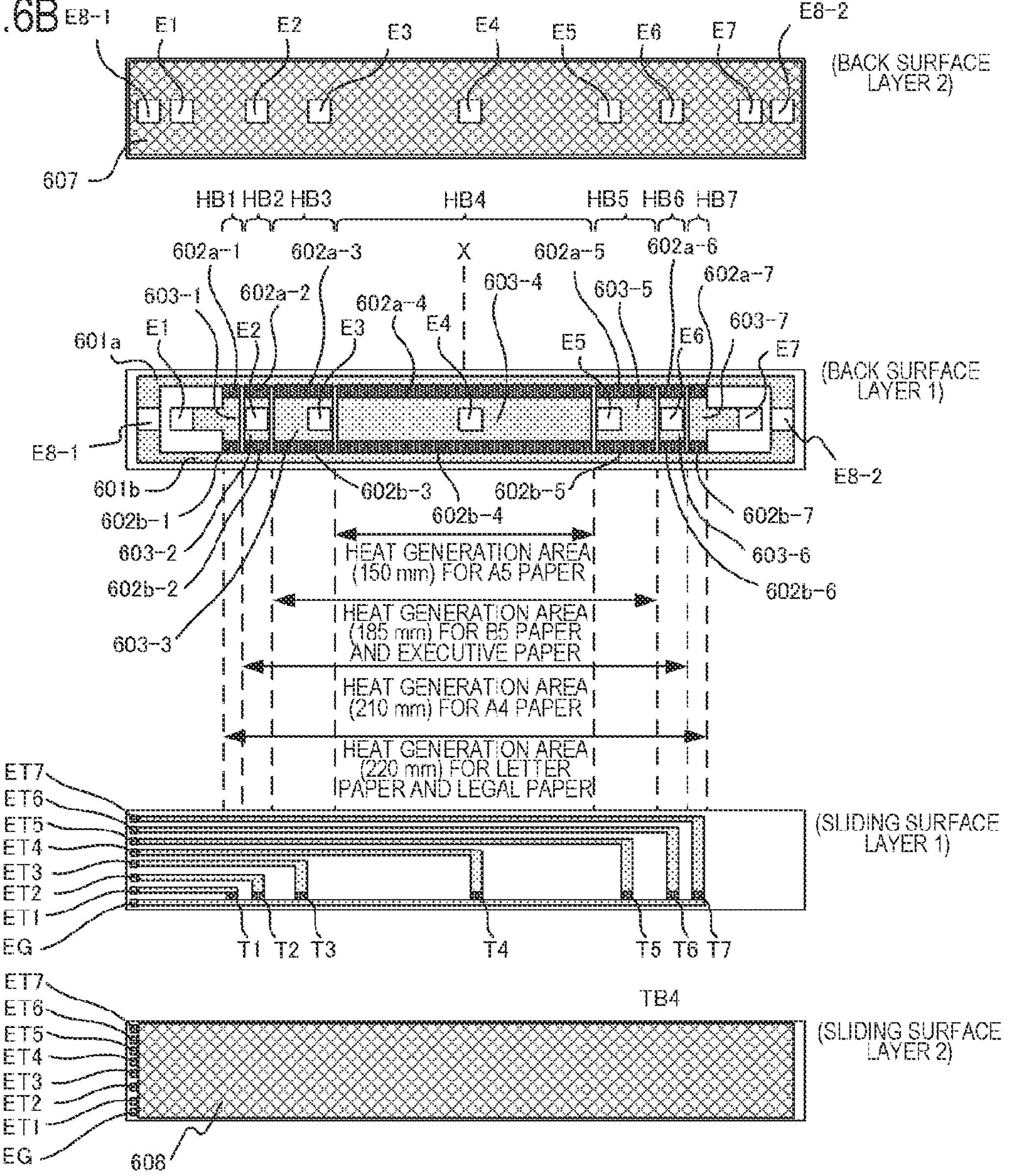
Figure 6C:
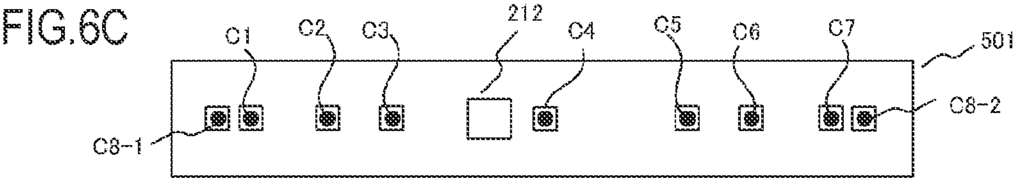

The configuration of the heater 600 according to Embodiment 2 will be described by using FIG. 6. FIG. 6(A) is a cross-sectional view of the heater 600 (a cross-sectional view in the vicinity of the transport reference position X in FIG. 6(B)), FIG. 6(B) is a plan view of each layer of the heater 600, and FIG. 6(C) is a plan view of the holding member 501 of the heater 600. The heater 600 is provided with two first electrical conductors 601 (601*a*, 601*b*) which are provided along the longitudinal direction of the heater 600 on the substrate 605. Further, the heater 600 is provided with a second electrical conductor 603 (603-4) at a position different from that of the first electrical conductor 601 in the lateral direction of the heater 600 on the substrate 605.

The first electrical conductor 601 is separated into an electrical conductor 601*a* which is disposed on the upstream side in the transport direction of the recording material P, and an electrical conductor 601*b* which is disposed on the downstream side therein. Further, the heater 600 has the heating element 602 (602*a*, 602*b*) which is provided between the first electrical conductor 601 and the second electrical conductor 603, and generates heat with power supplied via the first electrical conductor 601 and the second electrical conductor 603.

The heating element 602 is separated into a heating element 602*a* which is disposed on the upstream side in the transport direction of the recording material P, and a heating element 602*b* which is disposed on the downstream side therein. When a heat generation distribution in the lateral direction of the heater 600 (the transport direction of the recording material) becomes asymmetrical, a stress which occurs in the substrate 605 when the heater 600 generates heat is increased. When the stress occurring in the substrate 605 is increased, there are cases where the substrate 605 is cracked. To cope with this, the heat generation distribution in the lateral direction of the heater 600 is made symmetrical by separating the heating element 602 into the heating element 602*a* disposed on the upstream side in the transport direction and the heating element 602*b* disposed on the downstream side therein.

On the back surface layer 2 of the heater 600, the insulating surface protective layer 607 (made of glass in the present embodiment) which covers the heating element 602, the first electrical conductor 601 (601*a*, 601*b*), and the second electrical conductor 603 (603-4) is provided so as not to cover the electrode portion (E4).

As shown in FIG. 6(B), on the back surface layer 1 of the heater 600, a plurality of heating blocks each including a combination of the first electrical conductor 601, the second electrical conductor 603, and the heating element 602 are provided in the longitudinal direction of the heater 600. The heater 600 of the present embodiment has seven heating blocks HB1 to HB7 at the central portion and both end portions of the heater 600 in the longitudinal direction. The heating blocks HB1 to HB7 are constituted by heating elements 602*a*-1 to 602*a*-7 and heating elements 602*b*-1 to 602*b*-7 which are formed symmetrically in the lateral direction of the heater 600. The first electrical conductor 601 is constituted by the electrical conductor 601*a* connected to the heating elements 602*a*-1 to 602*a*-7 and the electrical conductor 601*b* connected to the heating elements 602*b*-1 to 602*b*-7. Similarly, in order to correspond to the seven heating blocks HB1 to HB7, the second electrical conductor 603 is divided into seven electrical conductors 603-1 to 603-7.

Electrical contacts C1 to C7, C8-1, and C8-2 for supplying power from a power supply circuit 700 of the heater 600 described later are connected to electrodes E1 to E7, E8-1, and E8-2. Each of the electrodes E1 to E7 is an electrode for supplying power to each of the heating blocks HB1 to HB7 via each of the electrical conductors 603-1 to 603-7. Each of the electrodes E8-1 and E8-2 is an electrode to which a common electrical contact for supplying power to the seven heating blocks HB1 to HB7 via the electrical conductor 601*a* and the electrical conductor 601*b* is connected.

The surface protective layer 607 on the back surface layer 2 of the heater 600 is formed so as to cover the back surface layer 1 except the portions of the electrodes E1 to E7, E8-1, and E8-2. That is, the electrical contacts C1 to C7, C8-1, and C8-2 can be connected to the respective electrodes from the side of the back surface of the heater 600, and power can be supplied from the side of the back surface of the heater 600.

Thus, a necessity to provide wiring based on a conductive pattern on the substrate 605 is eliminated by providing the electrodes on the back surface of the heater 600, and hence it is possible to reduce the width of the substrate 605 in the lateral direction. Accordingly, it is possible to obtain effects of reducing the material cost of the substrate 605 and reducing the start-up time required to increase the temperature of the heater 600 by reducing the heat capacity of the substrate 605.

Incidentally, the electrodes E2 to E6 are provided in an area in which the heating element is provided in the longitudinal direction of the substrate, and the surface protective layer 607 is formed in the area except the portions of the electrodes E2 to E6. As a result, in the configuration of Embodiment 2, unlike the description in Embodiment 1, it is not possible to insulate the heating element 602 by covering the heating element 602 with the surface protective layer 607 and the substrate 605. To cope with this, in the present embodiment, as indicated by a dotted-line arrow in FIG. 6(A), the basic insulation is provided by increasing the creepage distance from the heating element 602 to the film 202 and the sliding surface layer by using the surface protective layer 607.

On the sliding surface layer 1 of the heater 600, the thermistors T1 to T7 are installed to sense the temperatures of the respective heating blocks HB1 to HB7 of the heater 600. One or more thermistors are provided for each of the heating blocks HB1 to HB7, and hence it is possible to sense the temperature of each of the heating blocks. In order to energize the seven thermistors T1 to T7, electrical conductors ET1 to ET7 for sensing the resistance value of the thermistor and a common electrical conductor EG of the thermistors are formed.

On the sliding surface (a surface in contact with the film 202) layer 2 of the heater 600, the surface protective layer 608 constituted by a coating of glass having slidability is provided. For connecting the electrical conductors ET1 to ET7 for sensing the resistance value of the thermistor and the electrical conductor EG, and electrical contacts, the surface protective layer 608 is provided at least in an area which slides on the film 202 except the end portion of the heater 600 in the longitudinal direction.

As shown in FIG. 6(C), the holding member 501 of the heater 600 is provided with holes for connecting the electrodes E1, E2, E3, E4, E5, E6, E7, E8-1, and E8-2 and the electrical contacts C1 to C7, C8-1, and C8-2. The above-described safety element 212 and the electrical contacts C1-C7, C8-1, and C8-2 are provided between the stay 204 and the holding member 501. The electrical contacts C1 to C7, C8-1, and C8-2 which come into contact with the electrodes E1-E7, E8-1, and E8-2 are electrically connected to the electrode portions of the heater by a method such as biasing with a spring or welding. Each electrical contact is connected to the power supply circuit 700 of the heater 600 described later via a conductive material such as a cable or a thin metal plate provided between the stay 204 and the holding member 501.

Figure 7:
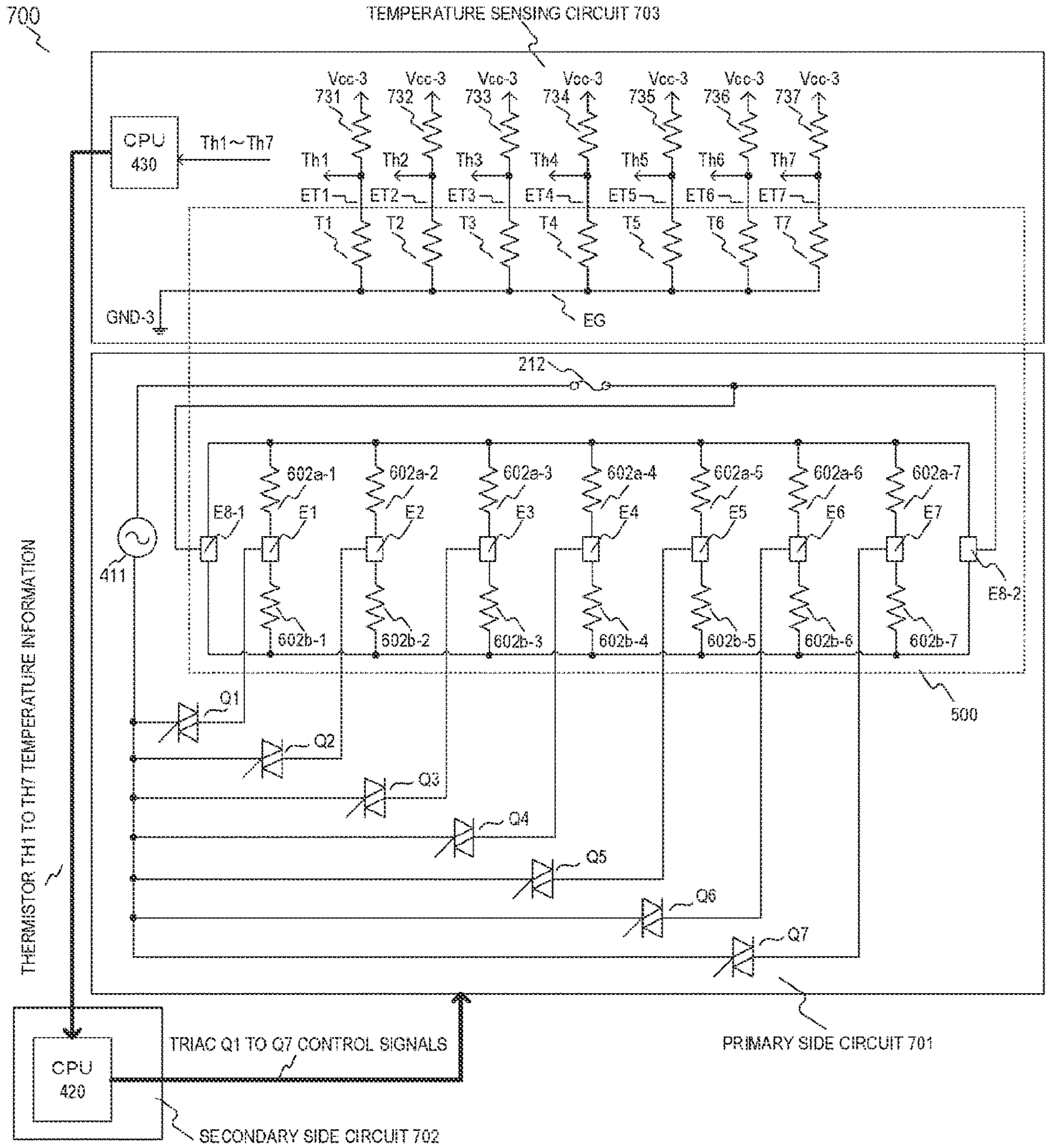
FIG. 7 is a view of a power supply circuit of the fixing apparatus of Embodiment 2.

FIG. 7 is a circuit diagram of the power supply circuit 700 of the heater 600 of Embodiment 2. The details of the driving circuit and the insulated circuit are the same as those in FIG. 4, and hence the depiction thereof is omitted in FIG. 7. In a primary side circuit 701, control of power to the heater 600 is performed by using energization/interruption of triacs Q1 to Q7. Each of the triacs Q1 to Q7 operates according to a control signal of the CPU 420 of an insulated secondary side circuit 702.

To the CPU 430, the resistance values of the thermistors T1 to T7 and the divided voltages of resistors 731 to 737 are inputted as Th1 to Th7 signals. The CPU 430 senses the heater temperature based on the Th1 to Th7 signals. The temperature information of the heater 600 sensed by the CPU 430 is transmitted to the CPU 420 of the secondary side circuit 402 which is insulated from the temperature sensing circuit by information transmission. The CPU 420 controls the power of each of the heating blocks HB1 to HB7 based on the temperature information of the heater 600.

Incidentally, as described above, the electrodes E2 to E6 of the heater 600 are positioned in the area in which the heating element is provided in the longitudinal direction of the substrate. Accordingly, the surface protective layer 607 is formed in the area except the portions of the electrodes E2 to E6. According to the configuration of the heater 600, a method in which the thermistors T1 to T7 and a temperature sensing circuit 703 are insulated from both of the primary side circuit 701 and the secondary side circuit 702 is more effective.

A disadvantage in the case where the thermistors T1 to T7 and the temperature sensing circuit 703 are not insulated from the primary side circuit 701 is the same as that in the description in Embodiment 1, and hence the description thereof will be omitted.

A description will be given of a disadvantage in the case where the thermistors T1 to T7 and the temperature sensing circuit 703 are not insulated from the secondary side circuit 702. It is necessary to provide the reinforced insulation between the primary side circuit 701 and the secondary side circuit 702, and a required creepage distance is increased. Therefore, it is necessary to increase the creepage distance shown in FIG. 6(A) to a distance corresponding to the reinforced insulation, and it is necessary to increase the width of the heater substrate 605 in the lateral direction. Alternatively, it is necessary to increase the thickness of the surface protective layer 608 to insulate the thermistors T1 to T7. In either case, a disadvantage that the thermal responsiveness of the heater 600 or the heat transfer efficiency to the nip portion N is reduced is caused. Accordingly, in the configuration in which the electrode is provided on the side of the back surface such as the configuration of the heater 600, a method in which the thermistors T1 to T7 and the temperature sensing circuit 703 are insulated from both of the primary side circuit 701 and the secondary side circuit 702 is more effective. Therefore, even in the configuration in which the seven heating blocks HB1 to HB7 can be controlled individually such as the configuration of the heater 600, it is possible to dispose the temperature sensing element on the sliding surface of the heater which slides on the film while preventing a reduction in each of the thermal responsiveness and the heat transfer efficiency of the heater and preventing an increase in the size of the heater.

As described thus far, the heater 600 and the power supply circuit 700 of the present embodiment have the following features. • The surface protective layer 607 and the substrate 605 of the heater 600 cover the heating elements 602*a* and 602*b* while not covering the electrode portions (E1 to E7, E8-1, E8-2) of the heating elements 602*a* and 602*b*. With this, the sufficient creepage distance is secured, and insulation is provided between the heating elements 602*a* and 602*b* serving as the primary side circuit, and the film 202 and the thermistors T1 to T7. • The seven heating blocks HB1 to HB7 can be controlled individually, and at least part of the electrodes (the electrodes E2 to E6) of the heating blocks HB1 to HB7 is provided in the area in which the heating element is provided in the longitudinal direction of the substrate. • The temperature sensing circuit 703 is insulated from both of the primary side circuit 701 and the secondary side circuit 702. • The thermistors T1 to T7 are insulated from both of the primary side circuit 701 and the secondary side circuit 702, and hence it is possible to reduce the thickness of the surface protective layer 608. • It is possible to dispose the thermistors T1 to T7 and the electrical conductors ET1 to ET7 and EG to which the thermistors are connected at any positions on the sliding surface layer of the substrate 605 (It is possible to reduce the width of the substrate of the heater 600 in the lateral direction, and increase the thermal responsiveness of the heater 600). Thus, the image forming apparatus of Embodiment 2 can also dispose the temperature sensing element on the sliding surface of the heater which slides on the film while preventing a reduction in each of the thermal responsiveness and the heat transfer efficiency of the heater and preventing an increase in the size of the heater.

Embodiment 3

Figure 8:
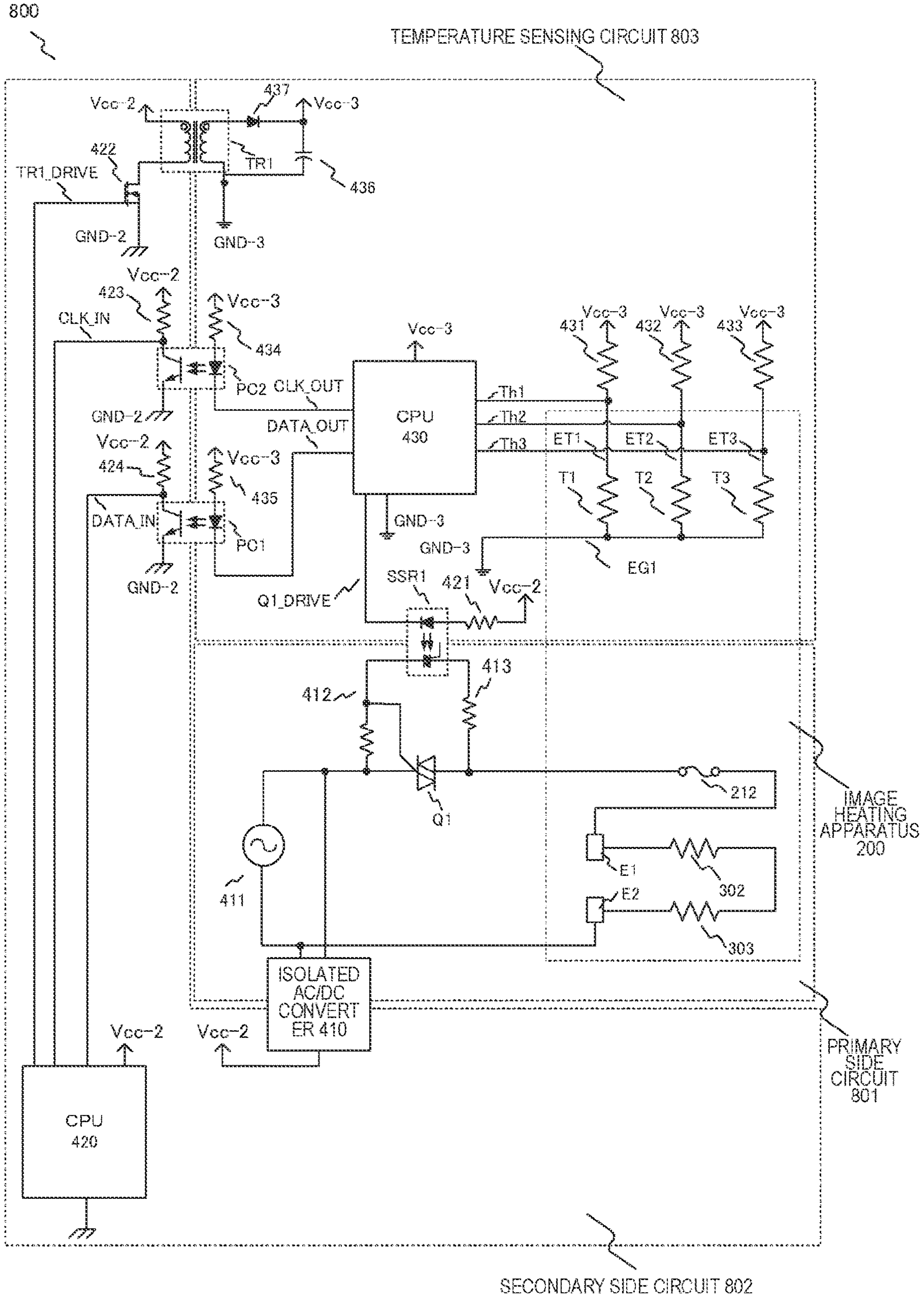
FIG. 8 is a view of a power supply circuit of a fixing apparatus of Embodiment 3.

Embodiment 3 of the present invention will be described. Components in Embodiment 3 which are the same as those in Embodiment 1 are designated by the same reference numerals, and the description thereof will be omitted. Matters which are not described specifically in Embodiment 3 are the same as those in Embodiment 1. A power supply circuit 800 of Embodiment 3 shown in FIG. 8 is different from the power supply circuit 400 of Embodiment 1 in that the CPU 430 also performs control of the triac Q1.

The CPU 430 performs the control of the triac Q1 according to data related to a target temperature transmitted from the CPU 420 serving as the control portion of a secondary side circuit 802. As shown in the present Embodiment 3, also in the case where the triac Q1 of a primary side circuit 801 is controlled by using the CPU 430 of a temperature sensing circuit 803, it is possible to dispose the temperature sensing element on the sliding surface of the heater which slides on the film while preventing a reduction in each of the thermal responsiveness and the heat transfer efficiency of the heater and preventing an increase in the size of the heater. In addition, also in the fixing apparatus 500 of Embodiment 2, similarly, control of the triacs Q1 to Q7 may be performed by using the CPU 430.

The invention claimed is:

1. An image forming apparatus comprising:

an image forming portion for forming an image on a recording material;

a fixing portion for fixing the image formed on the recording material to the recording material, the fixing portion includes a heater for heating the image;

a plurality of temperature sensing elements for sensing temperatures of the fixing portion;

a first central processing unit for controlling a power supplied to the heater in accordance with outputs from the plurality of temperature sensing elements, and a second central processing unit for transmitting information according to outputs from the plurality of temperature sensing elements to the first central processing unit, the second central processing unit is electrically connected to the plurality of temperature sensing elements.

2. The image forming apparatus according to claim 1, wherein the heater includes a substrate and a plurality of heating blocks which are arranged on the substrate along a longitudinal direction of the heater and each of which includes the heating element, and wherein power supplied to each of the plurality of heating blocks is independently controlled by the first central processing unit.

3. The image forming apparatus according to claim 2, wherein the heater includes a plurality of electrodes for respectively supplying power to the plurality of heating blocks in an area in which the heating element is provided in the longitudinal direction.

4. The image forming apparatus according to claim 1, wherein the fixing portion includes a tubular film and a pressure roller contacting an outer surface of the tubular film, and wherein the heater is provided in an inner space of the tubular film, and a fixing nip portion for nipping and conveying the recording material is formed between the heater and the pressure roller via the tubular film.

5. An image forming apparatus comprising:

an image forming portion for forming an image on a recording material;

a fixing portion for fixing the image formed on the recording material to the recording material, the fixing portion includes a heater for heating the image;

a plurality of temperature sensing elements for sensing temperatures of the fixing portion;

a first central processing unit for transmitting information according to target temperature, and a second central processing unit for controlling a power supplied to the heater in accordance with outputs from the plurality of temperature sensing elements and the information according to the target temperature transmitted from the first central processing unit, the second central processing unit is electrically connected to the plurality of temperature sensing elements.

6. The image forming apparatus according to claim 5, wherein the heater includes a substrate and a plurality of heating blocks which are arranged on the substrate along a longitudinal direction of the heater and each of which includes the heating element, and wherein power supplied to each of the plurality of heating blocks is independently controlled by the first central processing unit.

7. The image forming apparatus according to claim 6, wherein the heater includes a plurality of electrodes for respectively supplying power to the plurality of heating blocks in an area in which the heating element is provided in the longitudinal direction.

8. The image forming apparatus according to claim 5, wherein the fixing portion includes a tubular film and a pressure roller contacting an outer surface of the tubular film, and wherein the heater is provided in an inner space of the tubular film, and a fixing nip portion for nipping and conveying the recording material is formed between the heater and the pressure roller via the tubular film.

* * * * *